United States Patent

[11] 3,617,342

| [72] | Inventors | John Vincent Shennan<br>Preston;<br>Lionel Houston Ford, St. Annes-on-Sea, both of England |
| --- | --- | --- |
| [21] | Appl. No. | 713,287 |
| [22] | Filed | Mar. 15, 1968 |
| [45] | Patented | Nov. 2, 1971 |
| [73] | Assignee | United Kingdom Atomic Energy Authority<br>London, England |
| [32] | Priority | Mar. 22, 1967 |
| [33] | | Great Britain |
| [31] | | 13,593/67 |

[54] NUCLEAR REACTOR FUEL ELEMENTS
5 Claims, No Drawings

| [52] | U.S. Cl. | 117/46, 264/0.5, 117/100 |
| --- | --- | --- |
| [51] | Int. Cl. | G21c 21/00 |
| [50] | Field of Search | 264/0.5; 117/46 |

[56] References Cited
UNITED STATES PATENTS

| 3,151,037 | 9/1964 | Johnson et al. | 264/.5 |
| --- | --- | --- | --- |
| 3,179,723 | 4/1965 | Goeddel | 264/.5 |
| 3,165,422 | 1/1965 | Stoughton et al. | 264/.5 |

Primary Examiner—Carl D. Quarforth
Assistant Examiner—S. Hellman
Attorney—Larson and Taylor ABSTRACT: A method of producing coated particles of uranium dicarbide wherein a layer of pyrolytic carbon is deposited on uranium carbide particles of composition from $UC_{1.0}$ to $UC_{1.6}$ at a temperature (e.g., 1000° C. to 1400° C.) such that little reaction occurs between the particles and the applied carbon coating followed by application of an outer coating of high density fission product retaining material on the carbon coated particles at a temperature (e.g., above 1450° C.) such that reaction takes place between the initial coating of pyrolytic carbon and the uranium carbide particles to form uranium dicarbide ($UC_{1.85}$). A gap is produced between the particles and the coating on the particles.

NUCLEAR REACTOR FUEL ELEMENTS

BACKGROUND OF THE INVENTION

This invention relates to nuclear reactor fuel elements and in particular to that kind of nuclear reactor fuel element which comprises aggregated spheroidal particles of uranium carbide each particle having an outer coating of fission product retaining material, such as silicon carbide or high density pyrolytically deposited carbon.

U.S. Pat. No. 3,284,549 discloses a method for producing particles of uranium carbide having an outer coating of fission product retaining refractory material, comprising the steps of applying an initial thin coating of pyrolytic carbon on particles of uranium monocarbide at a deposition temperature such that very little reaction occurs between the applied coating of pyrolytic carbon and the uranium monocarbide particles, followed by application of an outer coating of fission product retaining refractor material on the pyrolytic carbon coated uranium monocarbide particles at a higher temperature such that reaction takes place between the initial pyrolytic carbon coating and the uranium monocarbide particles whereby the uranium monocarbide particles are converted to uranium dicarbide and voidage in the form of a gap is produced between the particles and the residual coating on the particles.

Coated particles in which the particles are directly bonded to the coating without the presence of a gap are subject to failure of the coating particularly on cooling of the coated particles from coating temperature to room temperature. On cooling of such coated particles to room temperature a considerable strain is developed in the coating because of the difference in thermal expansion coefficient between the particles and the coating, leading to cracking of the coating. Further an additional strain is imposed when the coated particles are reheated above the coating temperature and then cooled from this temperature in the form of final fabrication process which involves dispersion and incorporation of the coated particles into a dense matrix of a refractory material in rod form.

Such failure can be avoided by making the particles of low density (i.e., containing a high amount of porosity) and by providing a thick coating on the particles. If the particles are sufficiently strong (i.e. thick enough) cracking due to thermal cycling is confined to the particles.

Coatings of for example silicon carbide and of sufficient thickness act as a barrier to both gaseous and metallic fission products which are generated during irradiation of a fuel element incorporating such coated particles. Coatings of pyrolytically deposited carbon retain gaseous fission products and metallic fission products are retained by the dense matrix of nonfissile refractory material in which the coated particles are dispersed. Also the outer coating of the particles must be of sufficient thickness to withstand mechanical damage during the final fabrication of a rod of dense matrix material in which the coated particles are incorporated as a dispersion.

The optimum thickness of outer coating required for the purposes of fission product retention and for resistance to mechanical damage during the final fabrication stage is, in general, less than the thickness of coating required to provide resistance to failure on thermal cycling.

In coated particles produced by the method of U.S. Pat. No. 3,284,549 the presence of the gap between the particles and the outer coating permits thermal cycling of the particles without inducing radial cracking in the coating due to the larger thermal contraction of the coating as compared with the particles. Hence the method of U.S. Pat. No. 3,284,549 permits the production of particles having coatings of thickness optimized at about the minimum required for fission product retention and resistance to mechanical damage.

A coated particle produced by the method of U.S. Pat. No. 3,284,549 has a uranium content determined by three factors. These factors are the density of the uranium dicarbide kernel formed by conversion of the original uranium monocarbide particle by reaction with the initial layer of carbon, the dimension of the gap existing between the uranium dicarbide kernel and the residual coating on the particle after conversion, and the thickness of the coating of fission product retaining material. The density which can be achieved in the uranium dicarbide kernel produced by conversion of the original uranium monocarbide particle is dependent on the density which can be achieved in the original uranium monocarbide particle. In general uranium monocarbide particles cannot be produced of density greater than 90 percent of the theoretical density of uranium monocarbide. An outer coating of fission product retaining material is required of the optimum thickness necessary for fission product retention and resistance to mechanical damage. In the case of the gap which exists between the uranium dicarbide kernel and the coating after conversion of the original uranium monocarbide particles to uranium dicarbide the dimension of the gap is related to the amount of the initial layer of carbon which is required to convert the original uranium monocarbide particles to uranium dicarbide. The gap produced is not equivalent to the thickness of carbon which is used for conversion of the original uranium monocarbide particles as there is an increase in volume on conversion of uranium monocarbide to uranium dicarbide. However, it can be said that for a given particle size, the size of the gap produced, when starting with uranium monocarbide particles, will always be greater than a minimum value which is related to the amount of carbon required to convert the original uranium monocarbide particles to uranium dicarbide.

The factors of gap dimension and outer coating thickness determine the uranium concentration achieved in coated particles produced by the method of U.S. Pat. No. 3,284,549 in that these factors govern the final diameter of the coated particles.

For a particle having a given kernal diameter the higher is the final diameter of the particle the less is the uranium concentration in the particle. Having in mind that, irrespective of other factors, the thickness of the outer coating must be at least the optimum required for fission product retention and resistance to mechanical damage, it is the gap dimension which ultimately determines the uranium concentration achieved in particles having the optimum thickness of outer coating.

As stated above the method of U.S. Pat. No. 3,284,549 when starting with uranium monocarbide particles of given size, can only result in the production of coated particles having gaps which are larger than the minimum size determined by the amount of carbon required to convert the uranium monocarbide particles to uranium dicarbide. This imposes a limitation on the uranium concentration which can be achieved in coated particles produced by the method of the above numbered copending applications.

It is an object of the present invention to provide a modification of the method of U.S. Pat. No. 3,284,549 whereby the production of coated particles is enabled in which the gap produced between the uranium dicarbide kernel and the outer coating is less than the minimum size which can be achieved by the method of said United States Patent. Hence the method of the present invention produces coated particles having a higher uranium concentration than can be achieved by the method of U.S. Pat. No. 3,284,549 and it is a further feature of the present invention that coated particles can be produced having uranium dicarbide kernels of higher density than can be achieved by the method of U.S. Pat. No. 3,284,549 kernel density being the other factor which limits the uranium concentration which can be achieved in coated particles produced by the method of the United States Patent.

SUMMARY OF THE INVENTION

According to the present invention a method for producing particles of uranium carbide having an outer coating of fission product retaining refractory material comprises the steps of applying an initial coating of pyrolytic carbon to particles of uranium carbide of composition in the range $VC_{1.0}$ to $UC_{1.6}$ at a deposition temperature such that reaction between the applied coating of pyrolytic carbon and the particles of uranium carbide does not taken place by a substantial amount, followed by application of an outer coating on the pyrolytic carbon coated uranium carbide particles of a fission product retaining refractory material at a higher temperature such that reaction takes place between the initial coating of pyrolytic carbon and the uranium carbide particles to form uranium dicarbide ($UC_{1.85}$) so that voidage in the form of a gap is produced between the particles and the coating on the particles.

Preferably the method is carried out starting with particles of composition from $UC_{1.4}$ to $UC_{1.6}$.

The temperature of deposition of the initial coating of pyrolytic carbon is for example in the range 1000°–1400° C. preferably 1100° to 1300° C. The outer coating of fission product retaining refractory material is for example deposited at a temperature above 1450° C.

An initial coating of pyrolytic carbon may be deposited on the particles of greater thickness than required for conversion of the particles to uranium dicarbide so that during deposition of the outer coating of fission product retaining refractory material on the particles a proportion only of the initial coating of pyrolytic carbon is used up in conversion of the particles to uranium dicarbide and to produce the gap and a residual layer of the initial carbon coating is left inside the outer coating of fission product retaining refractory material which residual layer of carbon acts as a barrier against fission fragments from the uranium carbide kernel during irradiation.

The initial coating of carbon may be deposited on the particles by pyrolysis of methane or alternatively by the pyrolysis of acetylene.

Starting with particles of composition higher than $UC_{1.0}$, e.g. of composition $UC_{1.4}$ to $UXC_{1.6}$, less carbon is required than in the case of particles of composition $UC_{1.0}$ to effect conversion of the particles to uranium dicarbide. Thus the initial layer of carbon which is deposited can be less in thickness for particles having a higher carbon content than is required for particles of $UC_{1.0}$ and a smaller gap is produced between the uranium dicarbide kernel and the outer coating of refractory material when subsequently deposited at a higher temperature. Particles of composition $UC_{1.4}$ to $UC_{1.6}$ when made by reaction sintering of a mixture of $UO_2$ and carbon can be made to 95 percent of the theoretical density whereas particles of $UC_{1.0}$ can only be made to density of 90 percent theoretical. The use of particles of composition from $UC_{1.4}$ to $UC_{1.6}$ which are of 95 percent theoretical density in the method of the present invention results in the production of coated particles having uranium dicarbide kernels of higher density and therefore of higher uranium content than can be obtained starting with particles of composition $UC_{1.0}$ and of only 90 percent theoretical density.

DESCRIPTION OF THE PREFERRED EMBODIMENTS

A method in accordance with the present invention will now be described by way of example.

Uranium carbide particles of spheroidal form are prepared by the method disclosed in U.S. Pat. No. 3,293,332. The method disclosed comprises the steps of forming particles of a mixture of uranium dioxide and a binder and reaction sintering the particles so formed so as to produce particles of uranium carbide. In the present case the relative amounts or uranium dioxide and carbon used are such as to produce particles of required composition in the range $UC_{1.0}$ to $UC_{1.6}$.

The particles thus produced are graded by sieving to separate those of a size between for example 400 and 500 microns in diameter. Coating of the particles with pyrolytic carbon is now carried out in a fluidized bed reactor such as is also described in the above-mentioned U.S. Pat. No. 3,293,332. A bed of the particles is maintained in a fluidized condition in the reactor using high purity argon as the gas for fluidization. A hydrocarbon gas such as methane is used for deposition of the pyrolytic carbon coatings. The methane is mixed with argon fluidizing gas stream.

An initial coating of pyrolytic carbon is deposited on the uranium carbide particles at a deposition temperature in the range 1000° C. to 1400° C. for example at 1300° C. An initial carbon coating of at least sufficient thickness to react later with the uranium carbide particles and convert them to uranium dicarbide ($UC_{1.85}$) is applied on the uranium carbide particles.

For example in the case of particles of composition $UC_{1.0}$, $UC_{1.2}$, $UC_{1.4}$ and $UC_{1.6}$, having a density of 90 percent of the theoretical density and having an applied initial coating of carbon density 1.5 grams/cm.³, the following minimum thicknesses of initial carbon coating are required for conversion to $UC_{1.85}$.

TABLE 1

| Particle composition expressed by chemical formula | Particle diameter (microns) | | Initial coating thickness required to convert particle to uranium dicarbide ($UC_{1.85}$) microns | |
|---|---|---|---|---|
| | (a) | (b) | (a) | (b) |
| $UC_{1.0}$ | 400 | 500 | 19.75 | 25.25 |
| $UC_{1.2}$ | 400 | 500 | 15.2 | 18.75 |
| $UC_{1.4}$ | 400 | 500 | 10.3 | 12.5 |
| $UC_{1.6}$ | 400 | 500 | 6.0 | 7.0 |
| $UC_{1.85}$ | 400 | 500 | 0 | 0 |

The particle of composition $UC_{1.85}$ is included for comparison purposes.

An outer coating of fission product retaining refractory material such as pyrolytic carbon or pyrolytically deposited silicon carbide is now deposited on the particles at a temperature above 1450° C. for example in the range 1750°–2000° C. DUring deposition of the outer coating of fission product retaining refractory material the initial coating of carbon reacts with the particles to form uranium dicarbide ($UC_{1.85}$) so that a gap is produced under the coating around the uranium dicarbide particles.

The following table II shows the size of gap obtained for the particles of composition $UC_{1.0}$, $UC_{1.2}$, $UC_{1.4}$ and $UC_{1.6}$ in the table I above, it being the case that a thickness of carbon just sufficient as for conversion of the particles to uranium dicarbide is applied on the particles and an outer coating of fission product retaining material of 60 microns thickness is finally deposited on the particles.

The size of the gap produced depends on the amount of sintering which occurs in the particles on conversion to uranium dicarbide. However the gap will be between maximum and minimum values on the basis:

a. no reaction sintering occurs, i.e. there is no percentage change in theoretical density of the particle on conversion from the lower carbide to the dicarbide,
b. complete reaction sintering occurs, i.e. the particle is converted to 100 percent dense uranium dicarbide.

It is probable that some sintering and densification occurs when the outer coating is applied particularly above 1,500° C. and it is likely that the size of the gap will approach the maximum value in the following table.

TABLE II

| Particle composition expressed by Chemical formula | Particle diameter (micron) | Gap dimension (micron) | | Particle diameter (microns) | Gap dimension (microns) | | Uranium content of 500 micron coated particle grams/cm.³ |
|---|---|---|---|---|---|---|---|
| | | (a) Min. | (b) Max. | | (a) Min. | (b) Max. | |
| $UC_{1.0}$ | 400 | 6.8 | 14 | 500 | 8.8 | 18 | 4.83 |
| $UC_{1.2}$ | 400 | 4.7 | 11.8 | 500 | 5.35 | 14.4 | 4.94 |
| $UC_{1.4}$ | 400 | 2.05 | 9.5 | 500 | 2.48 | 11.5 | 4.98 |
| $UC_{1.6}$ | 400 | 0.8 | 6.85 | 500 | 1 | 8.5 | 5.00 |
| $UC_{1.85}$ | 400 | 0 | 0 | 500 | 0 | 0 | 5.02 |

It can be seen from the above table II that the uranium content of the coated particles increases as the carbon content of the original particle increases. The figures in respect of particles of composition $UC_{1.85}$ are included for purposes of comparison but are not of practical significance because particles of composition $UC_{1.85}$ cannot be prepared of 90 percent of the theoretical density and in any case in such particles no gap exists between the kernel and the outer coating so that the outer coating will be subject to failure on thermal cycling. The advantage of increased uranium content levels out between particles of composition $UC_{1.4}$ and $UC_{1.6}$ and this is the preferred range of compositions.

In an alternative method an initial layer of pyrolytic carbon of greater thickness than required solely for conversion of the particles to uranium dicarbide can be applied on the particles. On application of the outer coating of fission product retaining refractory material at the higher temperature a proportion of the initial carbon coating will be used up in accordance, for example, with the thickness of carbon required for conversion of the particles to uranium dicarbide as given in table I and corresponding gaps will be produced as given in table II. However, a proportion of the nickel layer of carbon will remain as part of the coating of the particles forming a layer inside the outer coating of fission product retaining refractory materials separated by the gap from the kernel of the particle. By way of example in the case of particles as disclosed in table II, if the coating of fission product retaining refractory material plus the residual carbon coating is made of 60 microns thickness the same uranium content will be obtained in the particles. This of course will require the deposition of a thinner outer coating of fission product retaining refractory material on the particles to achieve the same final overall coating thickness. The existence of the residual inner layer of carbon in the coated particles provides a barrier against escape of fission products generated in the kernel during irradiation. For this purpose the residual carbon layer should have a thickness of about 25 to 50 microns and to provide an overall coating thickness of 60 microns an outer coating of fission produce retaining refractory material of related thickness in the range 35 to 10 microns must be applied on the particles.

To obtain a required thickness of residual carbon in the coating an initial carbon layer of thickness equal to the amount of carbon required to convert the particles to uranium dicarbide plus the required residual thickness is applied on the particles.

For example in table I above the required thickness of carbon required for conversion of 400 micron particles of composition $UC_{1.2}$ to $UC_{1.6}$ is in the range 6 to 15 microns therefore the thickness of the initial carbon coating required on such particles for production of coated particles having coatings with a residual carbon layer in the range 25 to 50 microns will be 31 to 40 microns (to produce the minimum 25 micron residual carbon layer) and 56 to 65 microns (to produce the maximum 50 micron residual carbon layer).

As the outer coating provides resistance to mechanical damage substantial reduction in the thickness of the outer layer of fission produce retaining material in order to obtain the same overall composite coating thickness may be undesirable.

In the case of particles 400 and 500 microns original diameter as disclosed in table I and II above, but having residual carbon layers for example of thickness in the range 25–50 microns it may be desirable for example that the outer coating of fission product retaining refractory material should have a minimum thickness of 50 microns giving overall coating thickness in the range 75 to 100 microns compared with the coating thickness of 60 microns used in the examples of tables I and II above where the coating is solely of fission product retaining refractory material without the presence of a residual carbon layer. This of course means that the coated particle, will be of larger final diameter with a consequent reduction in uranium content.

The following table III gives details of such coated particles of 500 microns original diameter, having coating including a residual carbon layer of 25 microns in thickness and having an outer coating of fission product retaining refractory material 50 microns in thickness (i.e. total coating thickness 75 microns).

TABLE III

| Particle composition expressed by chemical formula | Gap dimension assuming complete sintering of particle occurs on conversion to $UC_{1.85}$ (microns) | Thickness of initial carbon coating deposited from methane (density 1.5 grams/cc.) (microns) | Thickness of initial carbon coating used in conversion of particle to $UC_{1.85}$ (microns) | Thickness of residual carbon layer in final coat (microns) | Uranium content of coated particle grams/cm.$^3$ |
|---|---|---|---|---|---|
| $UC_{1.2}$ | 14.4 | 43.75 | 18.75 | 25 | 4.32 |
| $UC_{1.4}$ | 11.5 | 37.5 | 12.5 | 25 | 4.34 |
| $UC_{1.6}$ | 8.5 | 32 | 7 | 25 | 4.35 |

If the initial carbon layer is deposited by pyrolysis of acetylene instead of by pyrolysis of methane the carbon deposited is of lower density i.e. the density of carbon deposited by pyrolysis of methane is 1.5 grams per cubic centimeter whilst the density of carbon deposited by pyrolysis of acetylene is 1.0 to 1.2 grams per cubic centimeter. If acetylene is used to deposit on initial carbon layer of sufficient thickness to leave a residual inner layer of carbon in the coating after conversion of the particles to $UC_{1.85}$ this residual carbon layer will be of lower density than a residual carbon layer left from an initial carbon coating which has been deposited by the pyrolysis of methane. The lower density carbon layer deposited from acetylene provides a more efficient barrier to fission products than does a higher density carbon layer as deposited from methane.

However, as an initial carbon layer deposited by pyrolysis of acetylene is of low density for example 1 gram per cubic centimeter a greater thickness of carbon will have to be provided in the initial layer for conversion of the particles to $UC_{1.85}$ than is the case when the initial carbon layer is deposited from methane.

Table IV below shows the comparison between the thickness of initial coating required to convert 500 micron diameter particles of the indicated composition (a) when the initial carbon coating is deposited by pyrolysis of methane and (b) when the initial carbon coating is deposited by pyrolysis of acetylene. In the case of deposition of the initial carbon layer from acetylene a greater thickness of carbon is required for conversion and this of course is reflected in the size of the gap which is produced.

TABLE IV

| Particle composition expressed by chemical formula | (a) Initial carbon coating thickness required for conversion when deposited from methane (carbon density 1.5 grams per cubic centimetre) (microns) | (a) Gap dimension (microns) | (b) Initial carbon coating thickness required for conversion when deposited from acetylene (carbon density 1.0 grams per cubic centimetre) (microns) | (b) Gap dimension (microns) |
|---|---|---|---|---|
| $UC_{1.2}$ | 18.75 | 14.4 | 27 | 23.5 |
| $UC_{1.4}$ | 12.5 | 11.5 | 18 | 16.5 |
| $UC_{1.6}$ | 7 | 8.5 | 10 | 11.9 |

In the method for fabrication of uranium carbide particles as disclosed in U.S. Pat. No. 3,293,332 particles of a mixture of uranium dioxide and carbon are grown to a desired size and then reacted and sintered in vacuum in a two temperature process. At the lower temperature, about 1,400° C., $UO_2$ is reduced by carbon to form uranium carbide and when reaction is complete, sintering is effected at the higher temperature, 1600°–1700° C. The carbothermic reduction occurs according to the chemical equation $$UO_2 + 3C = UC + 2CO$$

If the carbon/$UO_2$ ratio in the original mix is that given by the above equation, the final product is essentially uranium monocarbide. If the carbon content is at a higher value then, in general a two phase product will result comprising uranium mono and di-carbide phases, the proportions depending on the original carbon concentration. Eventually the final product will consist entirely of dicarbide although the carbon content of this phase is variable and always lower than that defined by the formula, $UC_2$. In general in preparations made by reduction of $UO_2$, the carbon content may be expressed by the formula $UC_{1.85}$. It is also the case that if the CO evolution is not maintained at a steady rate and some sintering is allowed to occur at the reaction temperature, which acts to slow down the reduction reaction, then it is possible to nucleate also the sesquie carbide phase ($U_2C_3$).

It is a feature of the above process that where $UC_{1.0}$ is the intended final product it is difficult to remove all oxygen completely because of the lack of ideal homogeneity of the mix and the difficulty of removing all CO before sintering is effected. Thus, the final product, although single phase, will contain between 0.1 wt. percent and 0.2 wt. percent oxygen and the final sintered density is limited to a maximum value of 12.3 g./cm.$^3$, i.e. 90 percent theoretical density. When the carbon content is increased to the level where the final product may be expressed by the formula $UC_{1.2}$ the oxygen content falls to 0.05 wt. percent and at a final composition of $UC_{1.4}$ oxygen contents 50 p.p.m. may be obtained. In addition this complete reduction at the reaction temperature allows a product of higher relative density. For example $UC_{1.5}$ gives a 95 percent relative density at 12.0 g./cm.$^3$. Above $UC_{1.6}$ the density of the final product falls rapidly until at $UC_{1.85}$ relative densities between 60 percent and 70 percent represent the maximum value. The associated high porosity of the samples leads to extensive oxidation under atmospheric conditions and the oxygen content of the product rises again to high values.

As it is possible to prepare particles of 95 percent of the theoretical density in the composition range $UC_{1.4}$ to $UC_{1.6}$ even greater uranium contents can be obtained than as shown in the tables above which relates to particles having a density of 90 percent of the theoretical density. Thus for the composition $UC_{1.5}$ at a density of 12.0 grams/cm.$^3$ (95 percent of the theoretical density) the uranium density of the final coated particle (500 microns original diameter) calculated on the same assumptions is 5.25 grams of uranium per cm.$^3$, which is 8 percent greater than can be obtained starting with a particle of composition $UC_{1.0}$.

We claim:

1. A method for producing particles of uranium carbide having an outer coating of fission product-retaining refractory material comprising the steps of applying an initial coating of pyrolytic carbon to particles of composition in the range $UC_{1.0}$ to $UC_{1.6}$ at a deposition temperature in the range 1000° C. to 1400° C. such that reaction between the applied coating of pyrolytic carbon and the particles of uranium carbide does not take place by a substantial amount followed by application of an outer coating on the pyrolytic carbon-coated particles of a fission product-retaining refractory material at a higher temperature above 1450° C. such that reaction takes place between the initial coating of pyrolytic carbon and the uranium carbide particles to form uranium dicarbide ($UC_{1.85}$) so that voidage in the form of a gap is produced between the particles and the coating on the particles.

2. A method as claimed in claim 1 wherein the uranium carbide particles employed are of composition from $UC_{1.4}$ to $UC_{1.6}$.

3. A method as claimed in claim 1 wherein an initial layer of carbon is deposited on the uranium carbide particles of greater thickness than required for conversion of the uranium carbide particles to uranium dicarbide whereby a residual inner layer of carbon remains as part of the coating on the particles.

4. A method as claimed in claim 1, wherein the initial carbon coating is deposited on the uranium carbide particles by pyrolysis of methane.

5. A method as claimed in claim 1, wherein the initial carbon coating is deposited on the uranium carbide particles by pyrolysis of acetylene.